US006633823B2

(12) United States Patent
Bartone et al.

(10) Patent No.: US 6,633,823 B2
(45) Date of Patent: Oct. 14, 2003

(54) SYSTEM AND METHOD FOR MONITORING AND CONTROLLING ENERGY USAGE

(75) Inventors: Erik J. Bartone, Rocky Hill, CT (US); Ernest L. Mendenhall, Jr., Vernon, CT (US); John H. McClutchy, Jr., Darien, CT (US); Devang N. Patel, Danbury, CT (US)

(73) Assignee: Nxegen, Inc., Middletown, CT (US)

( * ) Notice: Subject to any disclaimer, the term of this patent is extended or adjusted under 35 U.S.C. 154(b) by 72 days.

(21) Appl. No.: 09/906,031

(22) Filed: Jul. 13, 2001

(65) Prior Publication Data

US 2002/0072868 A1 Jun. 13, 2002

Related U.S. Application Data

(60) Provisional application No. 60/218,094, filed on Jul. 13, 2000.

(51) Int. Cl.[7] ........................ G01R 15/00; G01R 21/00; G06F 11/00
(52) U.S. Cl. ........................ 702/57; 702/62; 702/188; 700/295
(58) Field of Search .............................. 700/286, 295; 702/57, 189, 58, 60–62, 64–65, 122, 187–188, 183; 340/870.02, 870.16, 870.12

(56) References Cited

U.S. PATENT DOCUMENTS

| 4,749,992 A | | 6/1988 | Fitzemeyer et al. ... 340/870.02 |
| 5,500,561 A | | 3/1996 | Wilhelm ........................ 307/64 |
| 5,576,700 A | * | 11/1996 | Davis et al. ................ 340/3.31 |
| 5,818,725 A | * | 10/1998 | McNamara et al. ........ 700/286 |
| 6,088,659 A | * | 7/2000 | Kelley et al. ................. 702/62 |

* cited by examiner

Primary Examiner—Marc S. Hoff
Assistant Examiner—Manuel L. Barbee
(74) Attorney, Agent, or Firm—David D. Lowry; Joseph P. Quinn; Brown Rudnick Berlack Israels LLP

(57) ABSTRACT

A system and method for real time monitoring and control of energy consumption at a number of facilities to allow aggregate control over the power consumption. A central location receives information over a communications network, such as a wireless network, from nodes placed at facilities. The nodes communicate with devices within the facility that monitor power consumption, and control electrical devices within the facility. The electrical devices may be activated or deactivated remotely by the central location. This provides the ability to load balance a power consumption grid and thereby proactively conserve power consumption as well as avoid expensive spikes in power consumption. The present invention also includes a wireless network for communicating with the number of facilities, and which allows other information to be collected and processed.

20 Claims, 19 Drawing Sheets

*8 INPUTS ARE INDIVIDUALLY PROGRAMMABLE FOR N.O., N.C., E.O.L. AND VOLTAGE (4-30VOLTS).
DEFAULT SETTING IS E.O.L. SEE MANUAL FOR PROGRAMMING AND DETAILED DIAGRAMS.
NOTE: ALL INPUT/OUPUT CONNECTIONS MUST BE PROTECTED AGAINST ANY CONDITION THAT WOULD
INHIBIT THE OPERATION OF THIS DEVICE.
*DEFAULT SETTING IS FOR SUPERVISED / E.O.L. ZONE INPUTS. RESISTORS MUST BE INSTALLED ON ALL ZONE
INPUTS, EVEN WHEN NOT USED.

INPUT / OUTPUT CONNECTIONS
J1    PROGRAMMER / ACCESSORY PORT - CONNECTS TO PROGRAMMER.
J2    ZONE INPUTS TERMINAL BLOCK: GROUND (-): 8 ZONE INPUTS (DEFAULT = SUPERVISED END OF LINE RESISTOR (E.O.L)
J3    POWER INPUT TERMINAL BLOCK - 16.5 VAC
J4    ANTENNA CUT / ACKNOWLEDGEMENT DELAY OUTPUT - SHOULD THE UNIT NOT RECEIVE AN ACKNOWLEDGEMENT TO ANY MESSAGE FOR A TIME
LONGER THAN THE PROGRAMMED PERIOD, THE OUTPUT GENERATES 12 VOLTS BETWEEN THE PINS TO SIGNAL A PROBLEM. CONNECT TO A RELAY, SOUNDER OR
ALTERNATE COMMUNICATOR TO ANNUNCIATE THE PROBLEM (200 OHMS MAX LOAD).

CONTROLS
S1    RESET SWITCH - INITIALIZES CONTROLLER

UPGRADABLE INTEGRATED CIRCUIT
U1    MICROPROCESSOR, 40 PIN DIP; THIS CHIP IS MOUNTED IN A SOCKET, AND MAY BE REPLACED FOR UPGRADES OR SPECIAL APPLICATIONS.

FIG. 8B

ELECTRICAL RATING: 13.8VDC, 80ma STANDBY, 1000ma TRANSMIT
ONBOARD FUSE: SELF RESETTING
IN-LINE BATTERY FUSE: 3 AMPERE
RECHARGEABLE BATTERY REQ: 12V, 4 TO 7 AH
LOW BATTERY CONDITION IS REPORTED TO THE CENTRAL STATION.

STATUS INDICATORS

RX, TX - INDICATE RADIO RECIEVE (RX) OR TRANSMIT (TX)
WA - STEADY ON = WAITING FOR ACKNOWLEDGEMENT OF LAST TRANSMISSION;
    BLINKING = NOT ON NETWORK
    STEADY OFF = NORMAL

AL - ALERT / TROUBLESHOOTING INDICATOR, "BLINK" CODES AS FOLLOWS:
    — — — —         STEADY BLINK - SYSTEM OK;
    — — — —         SHORT-SHORT BLINK - LOW BATTERY;
    — — — —         SHORT-LONG BLINK - AN INPUT ZONE IS IN ALARM;
    — — — —         SHORT-SHORT-LONG BLINK, LOW BATT AND ZONE IN ALARM;
    STEADY          NO BLINK - SELFTEST FAILURE (OTHER THAN LOW BATT)

PWR - INDICATES UNIT HAS POWER

FIG. 9B

SCHEMATICALLY DEMONSTRATE HOW ENERGY DATA OF DIFFERENT ELECTRICAL PHASE TYPES CAN BE INTEGRATED TO THE RF MODULE VIA A PULSE OUTPUT FROM CT TRANSDUCER.

SYSTEM AND METHOD FOR MONITORING AND CONTROLLING ENERGY USAGE

RELATED APPLICATION

The present application claims the benefit of U.S. Provisional Application No. 60/218,094 filed on Jul. 13, 2000, which is incorporated herein by reference.

FIELD OF THE INVENTION

This invention is directed towards monitoring and control of electrical systems, and more particularly towards energy monitoring and control.

BACKGROUND

The Electric Utility Industry is deregulating through the divestiture of generation assets from the vertically integrated local utility companies. Historically, the local electric utility company owned and operated all components of generating and delivering electricity to its end use consumers through a regulated franchise agreement. These franchise agreements were regulated by individual state public utility commissions which oversee the operations, costs, and revenues of the local utility in order to ensure fair pricing among various ratepayers and the reliable delivery of electric service to all ratepayers.

Deregulation of the industry has dramatically changed the role that the local utility plays in providing energy to its end use consumers. In addition, new entrants to the marketplace have the ability to provide specific energy services that were not available or allowed in a regulated electric utility environment.

Deregulation has required that the Local Electric Utility Company or Local Distribution Company ("LDC") divest and sell its generation assets ("Power Plants") in a competitive auction. New entrants are allowed to competitively bid and purchase power plants in service territories where they traditionally had no market presence. With new entrants owning & operating power plants, they possess the ability to sell power at the wholesale and retail market level. Both options create opportunities for the power plant owners to provide electricity to end-users. The primary market barrier for new power plant owners to enter into and provide retail energy to end users is the inability to acquire detailed load profile information on a real-time basis.

The metering architecture that exists in the field today is geared toward providing only enough information to accurately bill consumers on a monthly basis for energy consumed. Because the industry was regulated, and service provided by a monopoly, energy use was billed based on "average" rates and prices. In the deregulated environment, the price of competitive electricity, generated by individual power plant owners, changes on an hourly basis based upon changes in supply and demand.

While technology continues to advance, the focus of various metering technologies and manufacturers continue to be more so on the efficiency by which data is collected (for billing purposes) and not necessarily for end-use energy management purposes.

For individual end users, the price of energy (generation component) in a regulated environment remained relatively consistent over the course of a day or month. This was due to the fact that the local utility had 100% of the market through a franchise agreement with the state regulatory body. Individual user's energy profiles were grouped together into an aggregated portfolio of all users resulting in the averaging of electricity generation prices. Capacity charges were used to penalize those who used energy during costly peak periods of the day. These capacity or demand charges remain with the regulated utility and continue to be charged as part of the LDC's transmission and distribution cost recoveries. For the competitive generation supplier, usage patterns by end users are no longer being charged on an "average" rate per kilo-watt hour. Pricing is derived on an hourly basis depending upon supply and demand requirements.

The lack of a real-time "centralized" energy communications, monitoring, and data collection system provides a significant barrier to the maturation of the competitive electricity generation industry. Competitive generation suppliers lack the ability to receive real-time load profile information of its customer "portfolio" or the aggregated real-time hourly use patterns.

SUMMARY

The present invention relates to the field of energy use/control and cost reductions through the management of individual or multi-customers energy use profiles on a portfolio basis via a communication network with two-way monitoring and control capability and sophisticated software and analytical tools. Embodiments of the invention include an ability to collect data from and manage individual user facilities, homes, buildings, or equipment from a centralized location and on a portfolio/aggregated basis. Substantial cost savings are achieved by managing individual users on a portfolio/aggregated basis by taking advantage of certain opportunities resulting from deregulation.

An illustrative embodiment of the present invention includes a centralized energy monitoring, equipment control, and energy procurement system that utilizes a wireless fixed communication network as the basis to deliver real-time energy use information from end users to a centralized data center for monitoring and control. One feature of this system is to manage and optimize energy costs of end users on a portfolio basis. In order to optimize both energy conservation and energy purchasing benefits in a deregulated environment, energy use profiles of individuals will need to be managed on a portfolio basis with other end users with complimentary and offsetting load profile characteristics. The system of the illustrative embodiment uses a wireless narrow-band frequency to packetize and transmit data from an end user's point source to the centralized data center. Current monitoring modules measure energy use for main facility loads or submetered equipment or end use loads. This information is transmitted via a wireless fixed communication network to the centralized data center. Systems and software within the centralized data center gathers real-time energy use data from end users within a fixed range and analyzes end load profiles on a portfolio basis. The software intelligence initiates and sends packetized commands to field devices located at the end users facility via the wireless fixed communication network. These commands are received by device controllers, such as Equipment Interface Modules ("EI Modules") and Demand-Side Management ("DSM") RF Modules. The EI Modules and DSM RF Modules receive the commands and start/stop equipment to control end use energy load profiles. By performing this automated activity, the portfolio managed by the centralized data center is optimized to reduce energy consumption during costly peak times and reduces the price of competitive energy from competitive generation suppliers that possess fixed capacity levels. The result and benefits of this system is to optimize the total cost of energy in a deregulated market.

Embodiments of the present invention manage and optimize energy costs of end users on a portfolio basis. In order to optimize both energy conservation and energy purchasing benefits in a deregulated environment, energy use profiles of individual end-users are managed on a portfolio basis with other end users having complimentary and offsetting load profile characteristics. At least one embodiment of the invention uses a 2-way wireless system in combination with Internet communications to packetize and transmit data from an end user's point source to and from a Centralized Data Center where sophisticated analysis can be performed utilizing complimentary data to initiate more effective control.

Proprietary software within the Centralized Data Center gathers real-time energy use data from end users and analyzes end load profiles on a portfolio basis. The software according to an illustrative embodiment of the invention initiates and sends packetized commands to field devices located at the end users facility via the wireless fixed communication network. These commands are received by Equipment Interface Modules ("EI Modules"). The EI Modules receive the commands and executes control of end-use devices. By performing this automated activity, the portfolio managed by the Centralized Data Center is optimized to reduce energy consumption during strategically advantageous times.

Embodiments of the invention having an ability to monitor energy and cost data on a real-time basis and control end user energy use remotely allow for the Centralized Data Center to optimize individual and/or aggregate load profile curves of the portfolio to reduce energy costs beyond each individual's abilities. Software that will reside at the Centralized Data Center can provide a real-time data link to competitive power suppliers in order to purchase competitive electricity on a real-time basis.

An illustrative embodiment of the inventions sends load profile data from the aggregate portfolios and receives real-time pricing signals from competitive suppliers of energy. Based on these price signals, the Software initiates commands (automatically and/or manually) to reduce energy use within selected and prioritized schedules. In the illustrative embodiment of the invention, these signals are sent via a two-way wireless fixed communication network to EI Modules to control and reduce energy use to optimize the portfolio's load profiles on a real-time basis.

The various embodiments of the present invention reduce the total cost of energy in a deregulated market for end use customers, energy suppliers, transmission and distribution providers and generation providers.

Information collected according to the various embodiments of the present invention allows the competitive energy suppliers to provide real-time pricing signals and capacity thresholds that affect pricing levels on an hourly basis. This information received by the competitive suppliers is analyzed by the Centralized Data Center and commands are initiated that can prioritize and control equipment to start/stop at the end users premises. The ability to centralize and manage this service on a portfolio level provides the service provider and energy supplier with the ability to have flexibility within its customer base to affect energy usage without affecting core business activities or comfort levels.

The present invention features a process that uniquely utilizes a combination of proprietary hardware and software to control energy use and/or generation (by directly controlling end-use devices that consume or generate energy), to achieve energy savings and/or to execute more effective energy management strategies to realize cost savings.

The present invention further features a method of managing energy use and generation by monitoring its use in real-time, predicting its future behavior through the use of sophisticated analytical tools and other data sources and controlling end devices that consume energy or generate it.

One embodiment of the invention includes a system for monitoring and controlling power usage among a plurality of facilities, with a device controller coupled to at least one power consuming device at each facility, the device controller to control the at least one power consuming device. It also includes a power measurement device within each facility, to measure power consumption by power consuming devices within the facility; a communications network, in communication with the device controllers and the power measurement devices; and a central location, in communication with the communications network, to remotely monitor power usage at each facility as measured by the power measurement device. The central location communicates with the device controllers over the communications network in order to individually control the at least one power consuming device at each facility.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
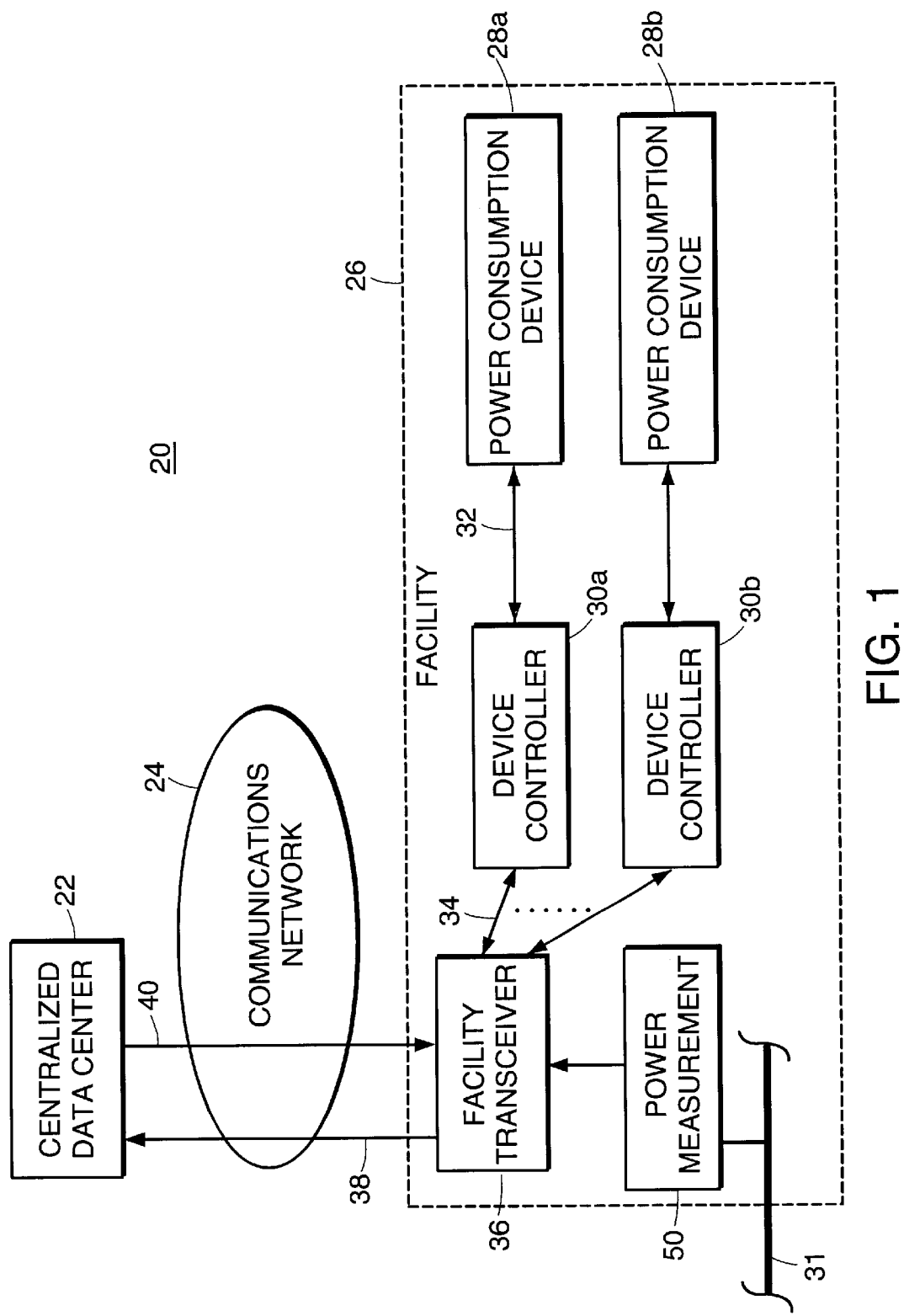
FIG. 1 is a block diagram of a system and method for controlling power usage in a facility according to the present invention.

FIG. 1 shows a system 20 for monitoring and controlling energy usage in a facility in accordance with the present invention. A centralized data center 22 is able to receive information from a plurality of facilities 26 over a communications network 24. The centralized data center 22 may be one location, or a plurality of separate locations which can collect and share data over various networks, for example the Internet, a VPN (virtual private network), wireless node connections, etc. Further, the centralized data center 22 does not necessarily have to be in the geographic center of the area of the facilities 26. The facility 26 can be any type of building or facility which uses electrical power, as will be described in more detail below.

Within the facility 26 are one or more power consumption devices 28. Typical examples are electrical devices such as refrigeration devices, HVAC systems, heating units, motor-driven systems, and any other high-load devices. Such devices 28 may alternatively be power producing devices such as generators, batteries, solar or fuel cells. According to the present invention, one or more power consumption device 28 is connected 32 to a device controller 30, wherein the device controller 30 can control the power consumption device 28. The device controller 30 can also monitor whether the power consumption devices 28 is drawing power, or even measure much more detailed information, for example the amount of power consumed, and the state of the power consumption device 28. Typically the power cord of the power consumption device 28 is simply plugged into a power outlet on the device controller 30, although other connections and controls are possible.

The device controllers 30 communicate 34 with a facility transceiver unit 36. The facility transceiver unit 36 serves as a central control and/or forwarding unit to provide a single point within the facility 26. The facility transceiver unit 36 also receives information from a power measurement device 50, which monitors power consumption within the facility 26 at a source such as the main power feed 31. More than one power measurement devices 50 may be used within a facility 26, to measure power consumption at different points. Further, a plurality of facility transceiver units 36 can work to control and monitor different areas or devices within the facility 26. The communication 34 between the facility transceiver unit 36 and the device controllers 30 and power measurement devices 50 can be by any form, including wireless communications, infrared signal, ultrasonic transmitters, power carrier signals, wire connections, or any packet switching networks such as Ethernet or Firewire.

The facility transceiver unit 36 communicates data over the communications network 24 to the centralized data center 22, as shown by arrow 38. Such information can include power consumption information for individual devices within the facility, or aggregate data such as total power consumption. Other types of data can be provided, such as environmental data, security information, monitoring information etc, as will be discussed below.

Thus the present invention allows the real-time monitoring of a vast number of power consumption devices 28 distributed in a plurality of facilities 26 over a geographic area, municipality, city, state etc. The monitoring allows analysis of the real-time data, which is invaluable for data recording, data mining and analysis, and prediction. A further feature of the present invention is the ability to control the power consumption devices 28 remotely, such as from the centralized data center 22, as shown by arrow 40. This control includes the ability to activate or deactivate a power consumption device 28, to limit the amount of power a power consumption device 28 is receiving, or to change the state or reprogram the power consumption device 28 as necessary. This added dimension allows micro control over the entire system, and provides many benefits such as load management, as will be discussed below.

Figure 2:
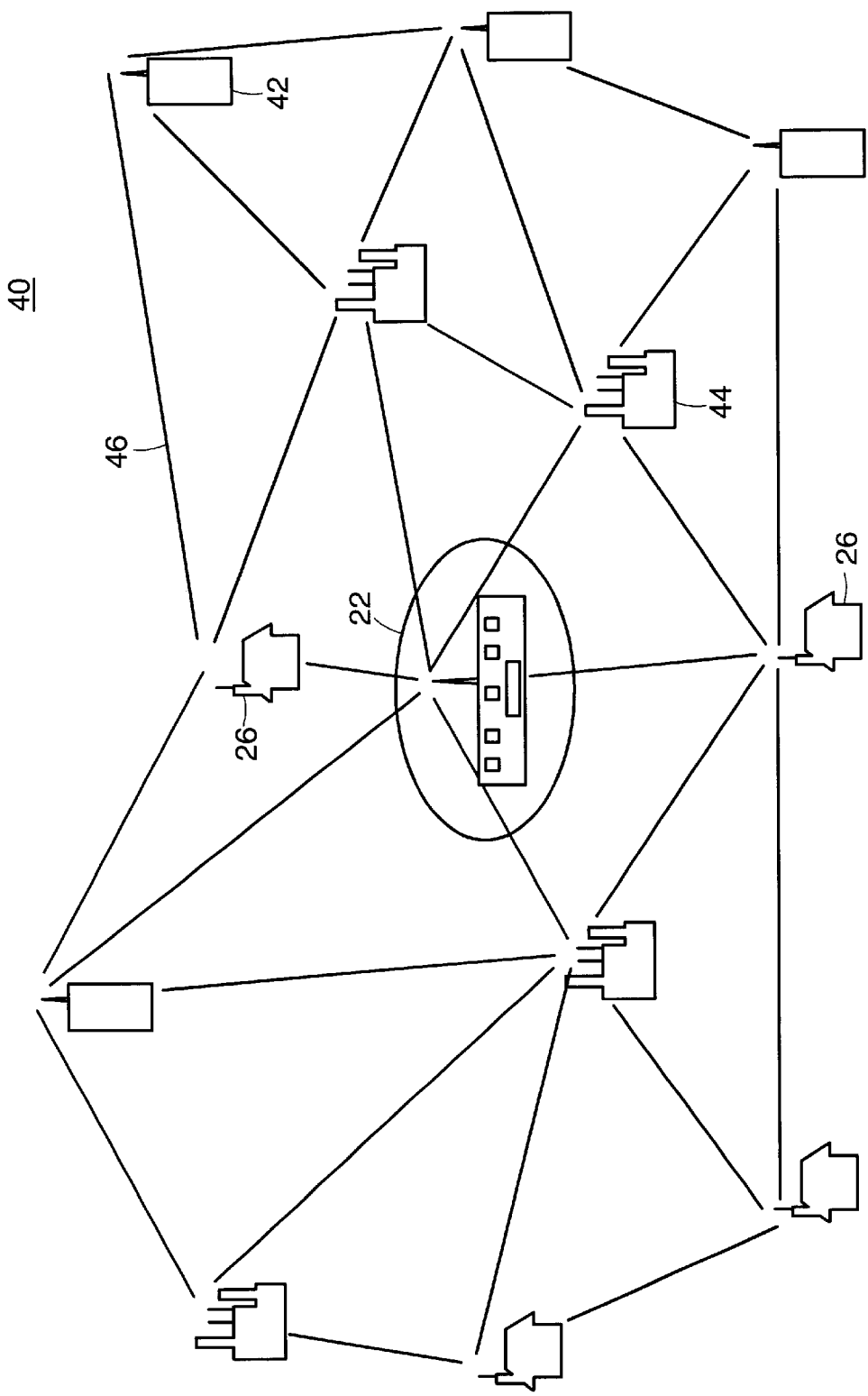
FIG. 2 shows an illustrative network for a communicating and monitoring system according to the present invention.

FIG. 2 shows an illustrative communication network 40 showing the centralized data center 22 and connections to the dwellings or facilities 26 such as residential houses or apartments, as well as buildings 42 and factories or manufacturing facilities 44. The communications network 40 in this illustrative embodiment is a wireless network comprising two-way RF communication links 46 between the various facilities 26, 42, 44 forming a complete network.

The present invention provides the ability to acquire real-time information from remote customer locations, the transmission of data to a central station location, the collection of this data into proprietary software and data storage methodologies that interpret the acquired data on a portfolio basis, and the determination of commands to control field devices to maximize the portfolio's aggregate energy consumption on a real-time basis. The ability to perform these functions on a real-time basis and through a centralized command center operations allows the system to optimize energy costs through load diversification and a variety of load management services that benefit all portfolio members.

Examples of specific services that can be performed from this invention are as follows:

1. Real-Time Portfolio Load Management and Load Curtailment Services. The centralized data center 22 collects real-time energy use data via the network 40 (for the illustrative embodiment, a wireless communications) infrastructure located throughout the defined service territory. The real-time energy use data collected from each end user facility 26 is received through packetized data transmitted from the Facility RF ("Radio Frequency") Modules to the RF Nodes located throughout the service territory and into the centralized data center's 22 data server. Each customer data is coded with ID numbers and added to the portfolio's 15-minute or hourly load profile curves. The data server software tracks peak load usage on a 15-minute basis and compares the aggregate load curves to targeted baseline curves that are defined by pricing factors provided by the portfolio power supplier(s). The data server software can also do real-time statistical analysis and energy use predictions based on the previous customer data, weather reports, and other dynamic factors. Based on real-time pricing and/or other factors, the centralized data center's 22 system will initiate commands that will signal power reductions at the customer site 26 on an automated basis. The signals will be sent via the wireless communications network 40 that includes transmission of load management commands back via the RF Node Network 46 to the Wireless Equipment Interface Modules (facility transceiver 36) and Demand-Side Management RF Modules (device controller 32). These modules have preset controls that perform the function of reducing voltage to equipment or panels or shutting off selected defined equipment for set periods of time based upon the central station control system software requirements.

Load management initiatives performed on a portfolio basis can be achieved by this system by several functions, including the reduction of end user power needs through shutting off power to selected equipment or reductions in voltage current to targeted equipment, or the remote dispatch of on-site power generation (back-up or standby generators). Both initiatives have the ability to reduce power consumption from the Power Supplier(s) on a real-time aggregate basis. Further, end users can set up predetermined energy use thresholds to receive benefits such as guaranteed limits on the power consumption, possibly at an incentivized price plan.

The benefits of this system's capabilities are numerous and include the ability to receive real-time energy use information, via a wireless communications infrastructure, as it is being consumed allows the centralized data center 22 to react to and maximize real-time pricing parameters with the aggregate portfolio usage patterns. Also, receiving real-time energy use information at a central location allows the service provider to aggregate and manage energy consumption on a portfolio basis. This allows the service provider to initiate load management commands that benefit the portfolio as a whole rather than distinct individual users that may not be able to receive maximum portfolio benefits. Further, a real-time system that centralizes energy use of a portfolio allows the service provider to monitor energy use reductions on a real-time basis that are verifiable to the selected power supplier(s). Savings derived from these functions are documented and provided to the customer in a summarized format via a secured format such as a secure Internet website.

Table 1 provides a list of example end user equipment at commercial, industrial, municipal facilities that can be controlled via the present invention.

TABLE 1

| End Uses | | Specific Equipment Controlled |
|---|---|---|
| Start/Stop Applications: | Heating, Ventilating, and Cooling Equipment | Motors, Compressors, Automation System Link, Thermostat |
| | Refrigeration Equipment | Motors, Motor Controls, Automation System Link, Thermostat |
| Voltage Reduction Applications: | Lighting | Direct Control with dimmable Ballasts, Voltage regulator within lighting panel |
| Supplementary Power Dispatch: | Onsite Generation | Remote dispatch of onsite backup generator or power source |

Table 2 provides a list of example end user equipment at residential/multi-tenant facilities that can be controlled via the present invention.

TABLE 2

| End Uses | | Specific Equipment Controlled |
|---|---|---|
| Start/Stop Applications: | Heating, Ventilating, and Cooling Equipment | Motors, Compressors, Thermostat, furnace or boiler controls or power source |
| | Refrigeration Equipment | Direct link between power source and refrigeration equipment |

2. Real-Time Energy Use Monitoring & Management Services. This centralized data center 22 System allows real-time energy use information to be collected and managed at a central location. The centralized data center 22 system has a direct connection with the Internet or other communications network to provide connections between other centralized data center systems located within the field. The Internet is also used to provide valuable real-time energy use and cost information back to the end user or for service provider technicians that provide energy monitoring and management services. These technicians ("energy analysts") have the ability to receive facility energy use data from multiple facilities located throughout a variety of states and regions via a central and secured website location. Having this information accessible through remote locations for a portfolio of facilities allows the energy analyst to perform detailed energy management assessments and benchmarking to determine where potential energy waste and inefficiencies exist within the portfolio. This allows for the maximum efficiency of dispatching labor to identify specific problems or issues within the facilities on a prioritized basis. The processing and display of information for end users and technicians includes data analysis, statistical analysis and interpolation, and prediction analysis to estimate future energy use.

3. Sub-Metering & Utility Billing Services. The system has the ability to provide sub-metering and utility billing services to those market segments that conduct business and relationships where these services may provide high value. For instance, the office building market is typically made up of multiple tenants occupying space within a building. The building may be master metered by the local utility company ("LDC") and individual tenants being billed on a per square foot basis. This process creates significant inequities between tenants depending on the energy use intensity, hours of operation, and equipment inventories. In a deregulated market, the differences in energy costs among tenants will become more profound. By installing submetering equipment within tenant occupied spaces, a more detailed measurement of energy use can provide better allocation of costs through direct billing for tenant usage. In addition, tenant's ability to gain access to real-time energy use via a secure website will encourage energy conservation and management and the ability to identify waste and inefficiencies not normally identified under the current metering and billing infrastructure.

4. Utility Bill Audit & Verification Services. The system software includes a detailed database of regulated rate tariffs and competitive supply pricing rate structures that are used to verify billing components generated from the LDC's monthly utility invoices to the end use customer. This database of rates provides customers with an audit of their current utility charges and identification of billing errors. Billing errors by the local distribution company can result from the end user; (1) being on the wrong regulated utility rate tariff, (2) billing components being miscalculated or calculated incorrectly, (3) generation rates from competitive energy supplier(s) being calculated and billed incorrectly, as well as numerous other billing errors. The system software and Rate Tariff Database provide the ability to audit a customer's utility bill via a secure website where a customer can log in on and input key billing parameters into the customer input section. The system software will then calculate the customer's monthly bill to be checked and verified against the actual LDC utility bill. Any errors or differences can be quickly identified and corrected.

5. Outage Notification Services. The centralized data center 22 receives continuous real-time energy consumption data via the wireless communications network 40 from end user facilities' master meter usage, end use equipment usage, submetering usage, etc. This information provides the ability to monitor power consumption and utility outages on a real-time basis. This information can be extremely useful for the customer as well as the Local Distribution Company ("LDC"). Customers that may have critical processing occurring at their facility during off-peak or non-occupied hours will find it extremely valuable to be notified of any power outages that may affect the operations within their facility. The LDC currently identifies outages from information gathered through a SCADA system that currently monitors substation power levels. The LDC does not have information with respect to customer outage information which can be critically valuable in understanding the impacts of revenue not being collected by specific customer outages.

6. Power Quality Analysis Services. The system provides the ability to install power quality modules located at the end users site. Information collected by these modules can be transmitted via the wireless communications network to the centralized data center 22. Real-time power quality data can be collected, stored, and analyzed by Energy Analysts via a secure website. This information can be extremely valuable to the end user for a number of reasons. The increased reliance on electronic equipment used in the day-to-day operations of businesses require higher and higher levels of power quality and reliability. Deregulation of the electric utility industry has resulted in lower and lower investments being made into the transmission and distribution systems of many, if not all, LDCs. The primary reason for this reduced investment over the past decade is the inability of the LDC to recoup these additional costs through rates. Legislative pressure has resulted in continued efforts to try and reduce overall utility costs. This has come at an expense and has resulted in a continued decline in the integrity and capacity of the LDC's distribution and transmission system infrastructure. Reduced investment has resulted in less and less preventive maintenance and investment into upgrading the system to meet the increased needs of higher grade power and reliability.

The system's ability to track power quality issues as well as the type of power quality problem allows the end user and the Energy Analyst to quickly diagnose the problems and develop recommended solutions that can be implemented to protect valuable equipment and associated processes.

Figure 3:
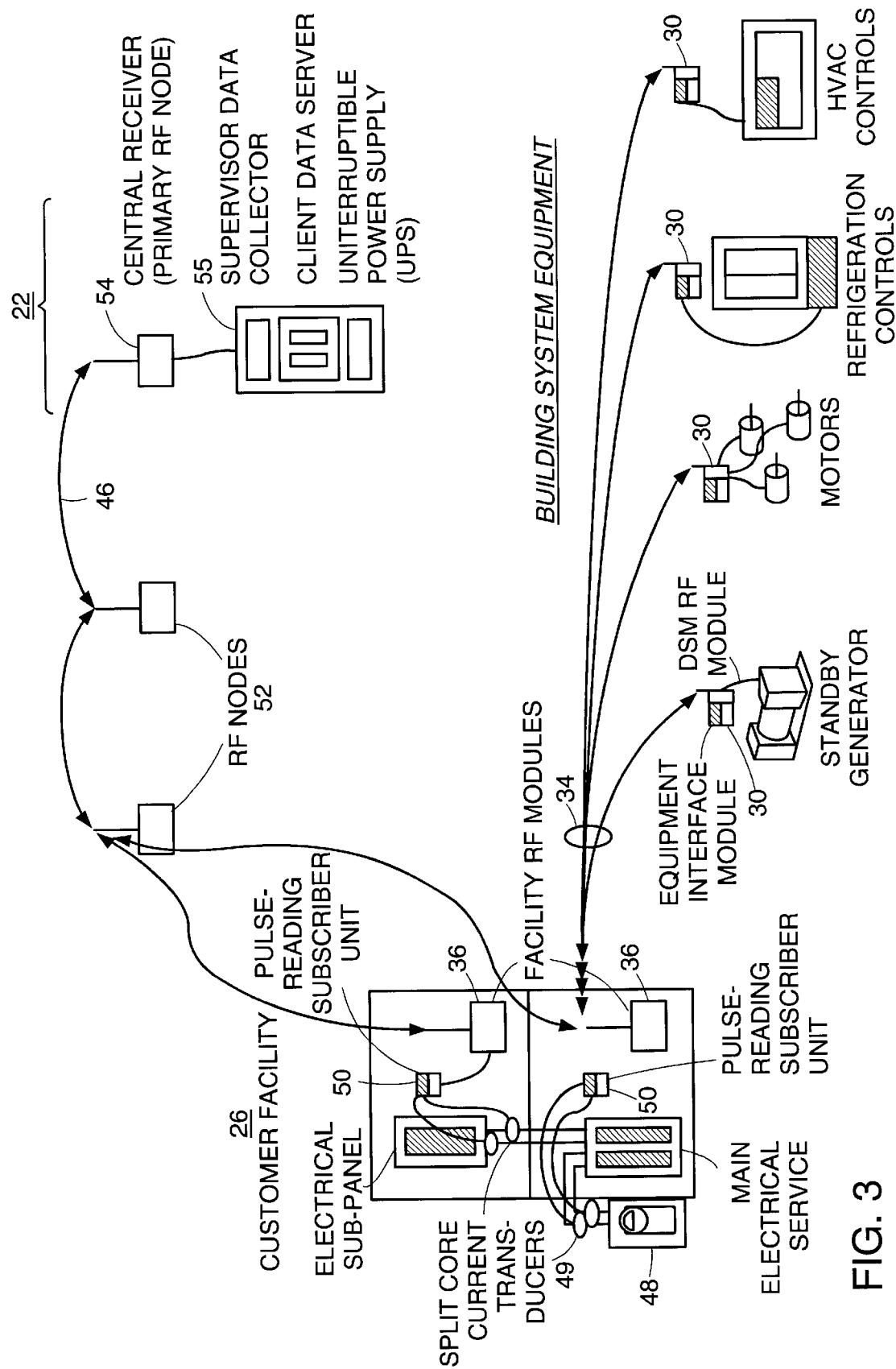
FIG. 3 is a diagram of an illustrative embodiment of the system and method of FIG. 1

FIG. 3 shows an illustrative embodiment of the present invention using the wireless communications network of FIG. 2. The centralized data center 22 includes a central receiver 54 which comprises a primary RF node in the communications network 40. Other RF nodes 52 can be at facilities 26 or serve as repeater nodes in the network separate from any facility 26. The RF node 52 provides a self-contained node in the network capable and will be described below.

At the facility 26 is the facility transceiver 36 which in the illustrative embodiment is known as a facility RF module. In the illustrative embodiment shown in FIG. 3, there are two facility RF modules 36 which communicate with other RF nodes 52 and also with the device controllers 30 within the facility 26. Two facility RF modules 36 allow for expandability of data collection and control within a single facility 26, however the illustrative embodiment can work with one facility RF module 36 at a facility 26. In the illustrative embodiment, the device controllers 30 are known as Equipment Interface Modules ("EI Modules"). The facility RF modules 36 also may receive data from other sources, such as current measurement devices like split-core current transducers 49 which are situated next to the power cables within the facility 26. These current transducers 49 are standard equipment devices which allow the non-intrusive measurement of current passing through the nearby power conduit. As shown in FIG. 3, one set of current transducers 49 are placed by the main power lines into the facility 26, near the electric meter 48, and another set of current transducers 49 are placed next to power lines to a sub-panel for a specific sub-unit within the facility 26. This allows the real-time measurement of both the total power utilization at the facility 26, and the portion of the power utilization by the specific sub-unit serviced by the sub-panel. As many current transducers 49 may be installed as preferred to allow the data acquisition to be performed on any granular level. Other such devices can include voltage measurement circuits, environmental measurement instruments, and line power quality measurement devices.

A feature of the present invention is that the system does not need to replace or modify the electric meter(s) 48 for the facility 26. This helps avoid having to work with high-voltage/high current power circuits with important safety concerns. Furthermore, utility electric meters are often owned by different parties and tampering with such meters may lead to loss of service or legal actions. The present invention allows measurements to be taken without affecting the electric meters, thereby avoiding any situation of interfering with equipment owned or leased by other parties.

The facility RF module 36 communicates by wireless signal to the individual EI modules 30 connected to the electrical equipment within the facility 26. As previously described, the EI modules 30 allow control over the electrical equipment 28 including the ability to activate or deactivate the electrical equipment 28, or to limit the amount of power the electrical equipment 28 consumes. Another example of control is if the electrical equipment 28 has a 'power conservation' mode, the EI module 30 can activate or deactivate this mode as required.

Figure 4A:
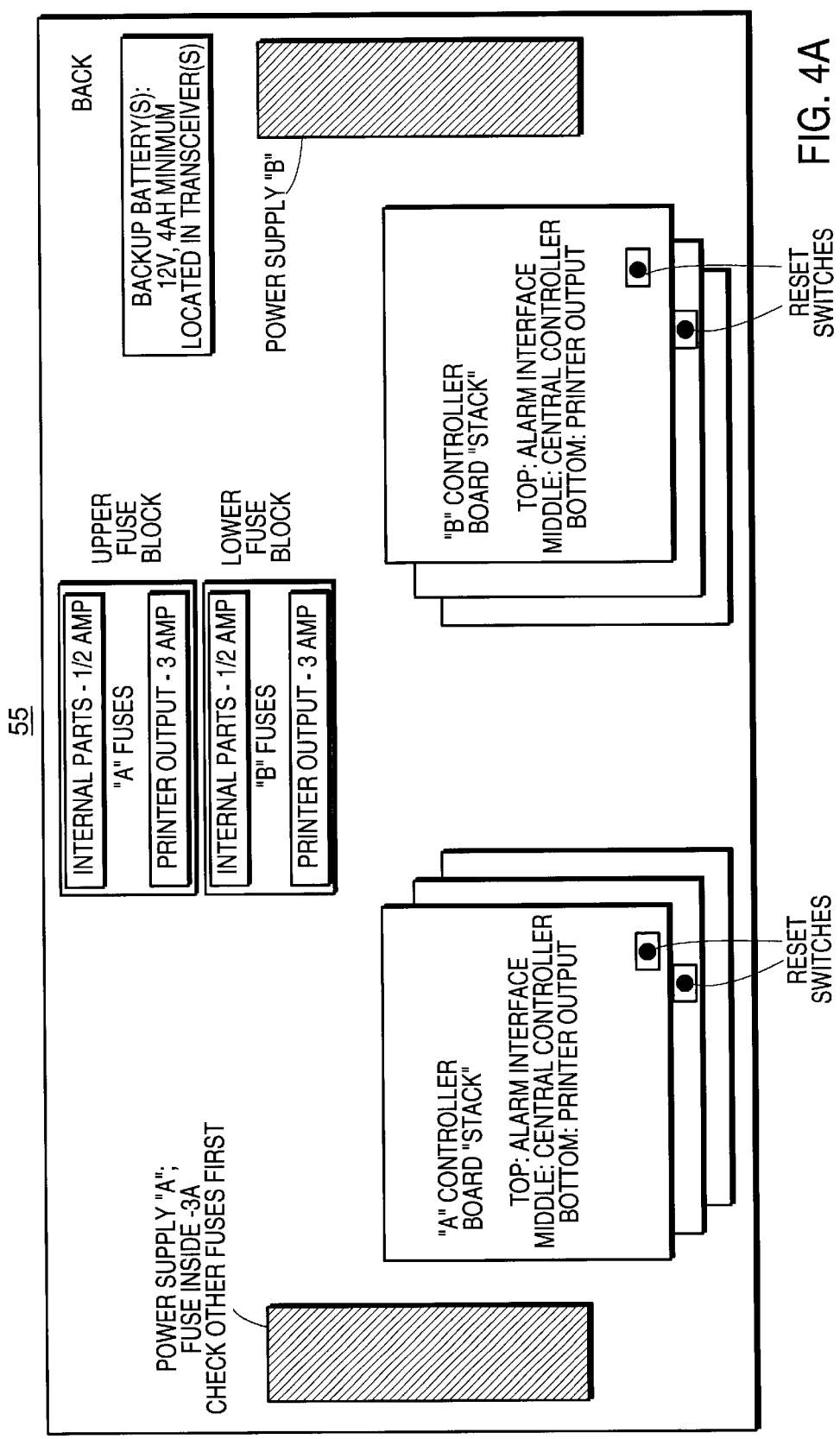
FIG. 4 is a block diagram of a supervisory central data collector and network controller of an illustrative embodiment.
Figure 4B:
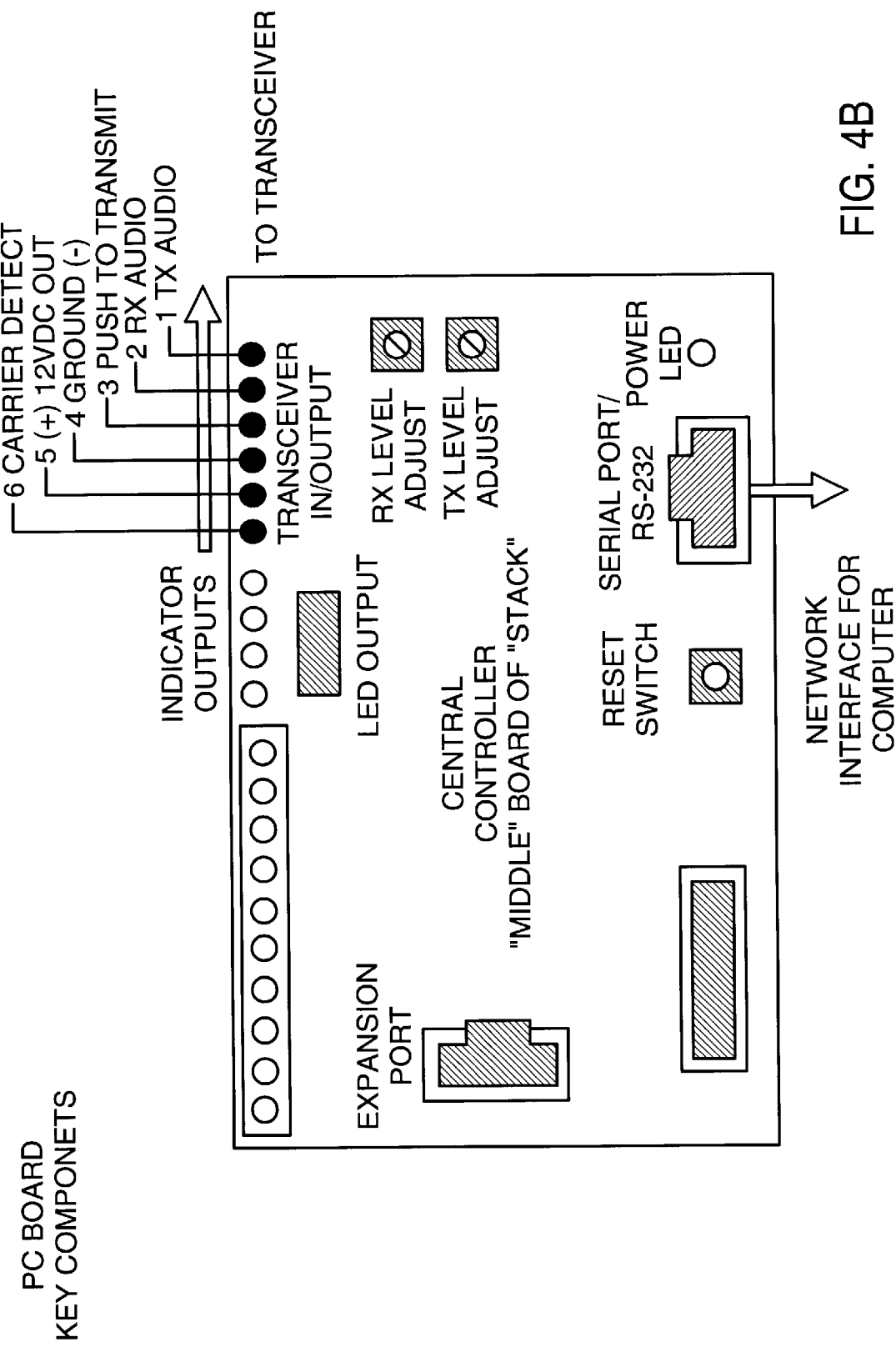
Figure 5:
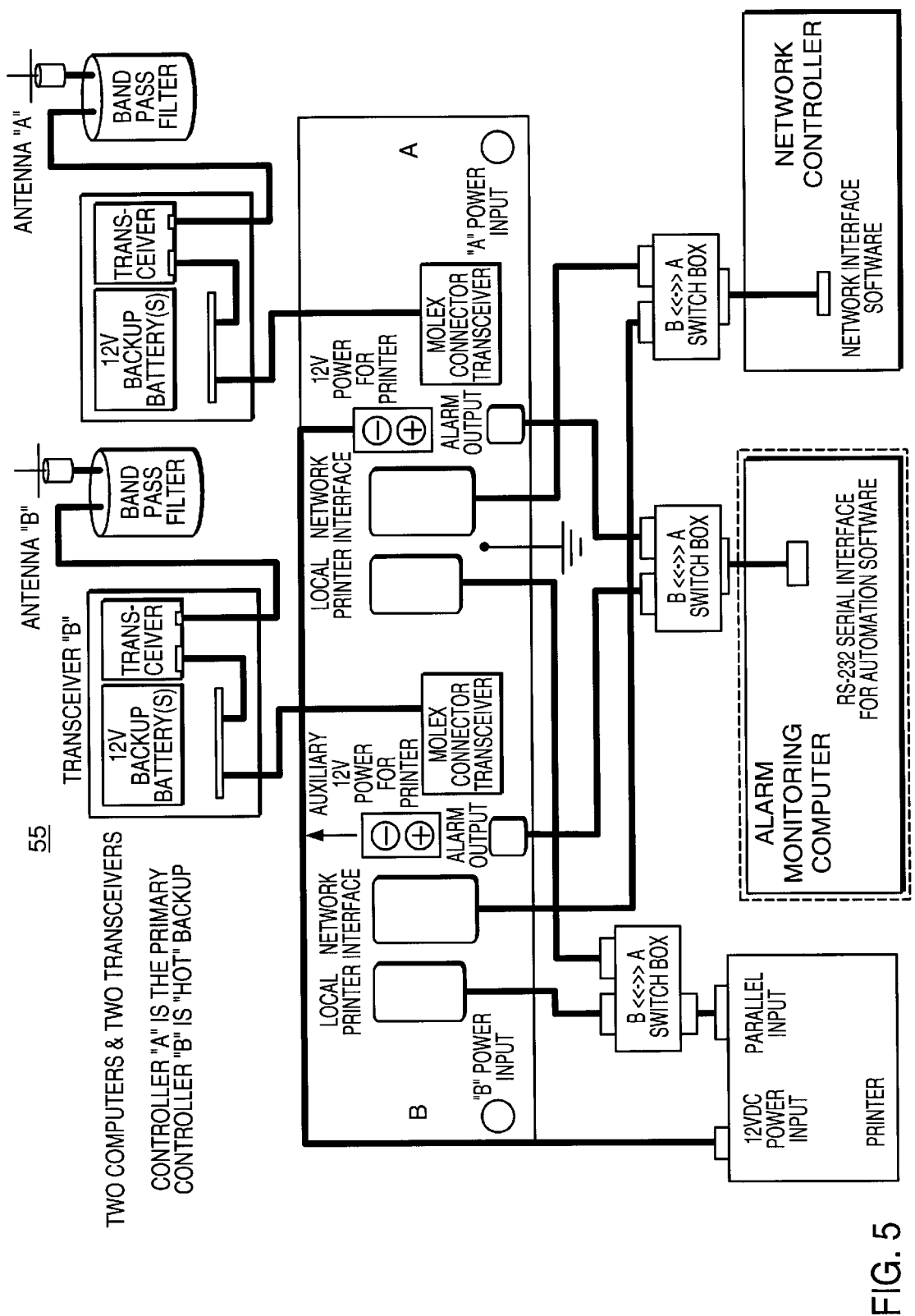
FIG. 5 is a block diagram of a system configuration of the supervisory central data collector and network controller of FIG. 4.
Figure 6:
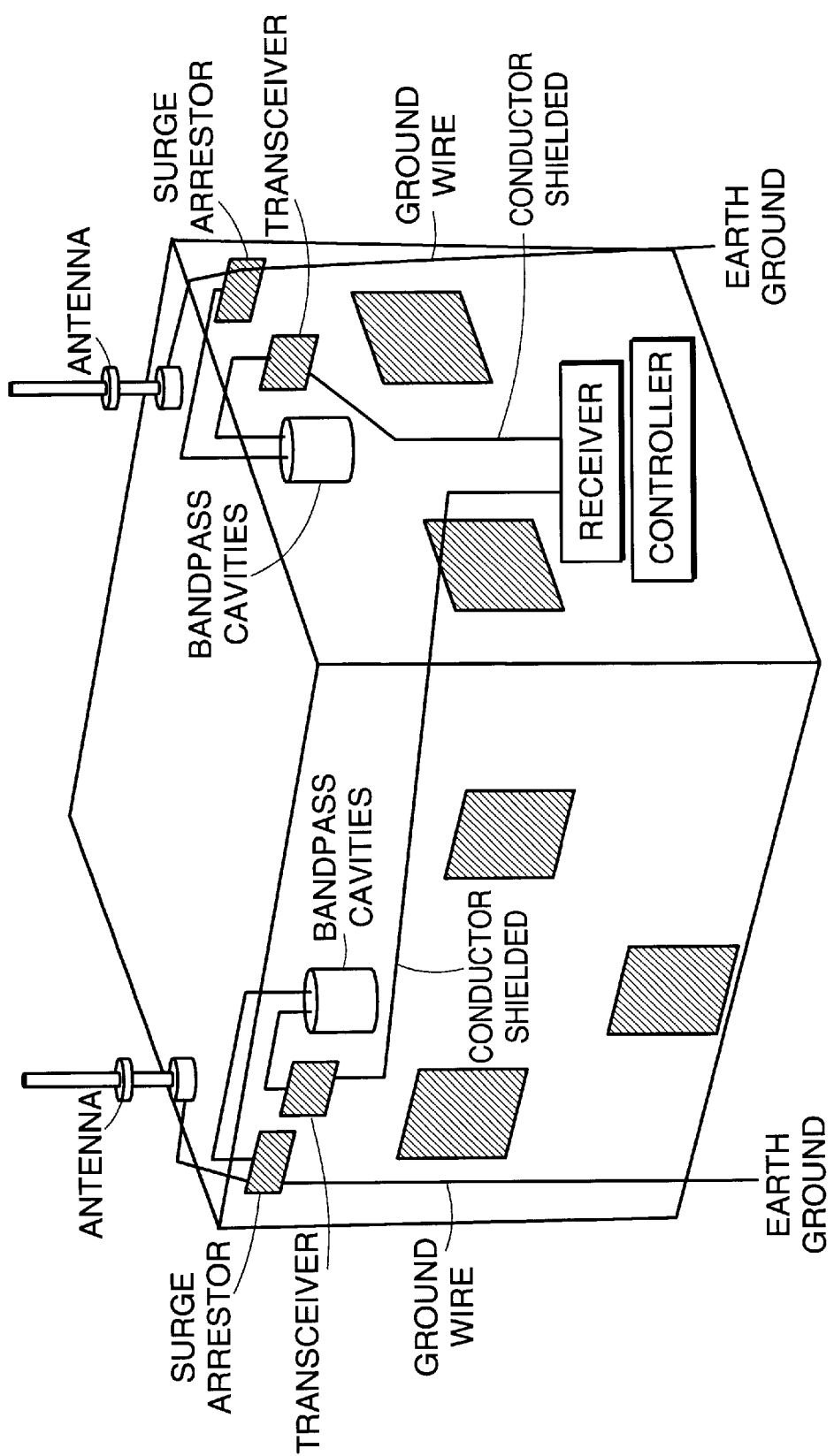
FIG. 6 is a block layout diagram of the supervisory central data collector and network controller of FIG. 4.

FIGS. 4, 5, and 6 are diagrams of the components, connections and general layout of the supervisory central data collector and network controller 55 according to the illustrative embodiment. The supervisory central data collector 55, housed at a central location 22, acts as the final receiving point for all data transmitted by the RF Facility Modules and RF Nodes 52 located at remote sites. The supervisory central data collector and network controller is a hard-wired interface between the base station radio transceiver and the computer/data server runs the Central Station operations. In the illustrative embodiment, the supervisory central data collector and network controller includes redundancy in the form of a hot backup unit. The supervisory central data collector and network controller receives radio signals transmitted from RF Facility Modules and/or RF Nodes 52. Packetized data is received and converted to numeric data by the supervisory central data collector and network controller software. Digitized numeric data is received and stored in the central station computer data server files. Each customer/end user receives a predetermined customer account number where all energy use data is collected and stored in an organized manner. Energy use data can be preset to be acquired, transmitted and delivered to a central station location in user selectable time intervals, or standard increments such as 15 minute, 30 minute, 1 hour and up intervals depending upon the requirements of the end user and/or service provider. Pre-determined intervals are programmed at the end user's location using a hand-held programming computer or can be performed at the central location 22 by re-transmitting data interval collection instructions to the RF Facility Module(s) 52.

Figure 7A:
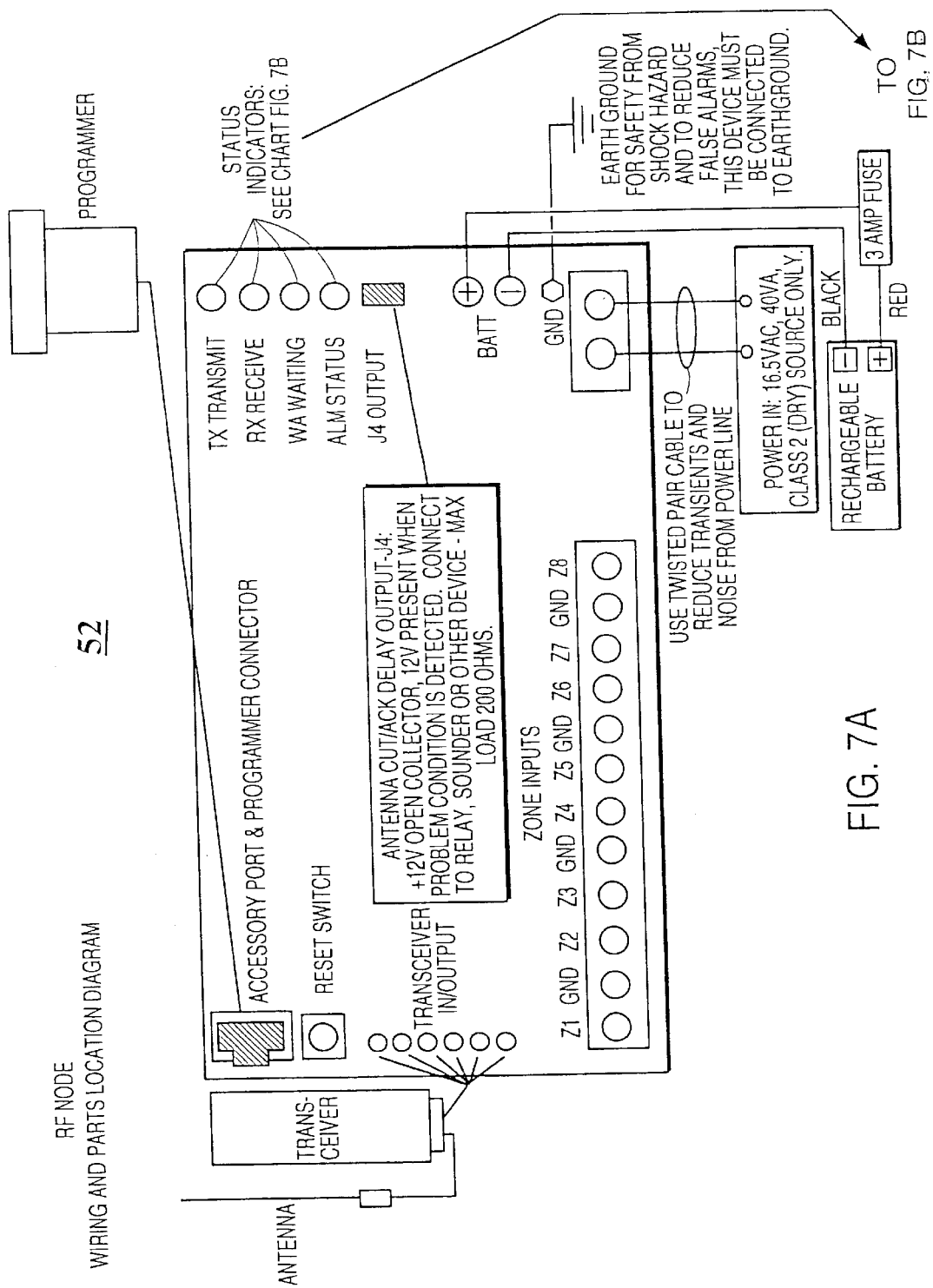
FIG. 7 is a block layout diagram of an RF node module and repeater of an illustrative embodiment.
Figure 7B:
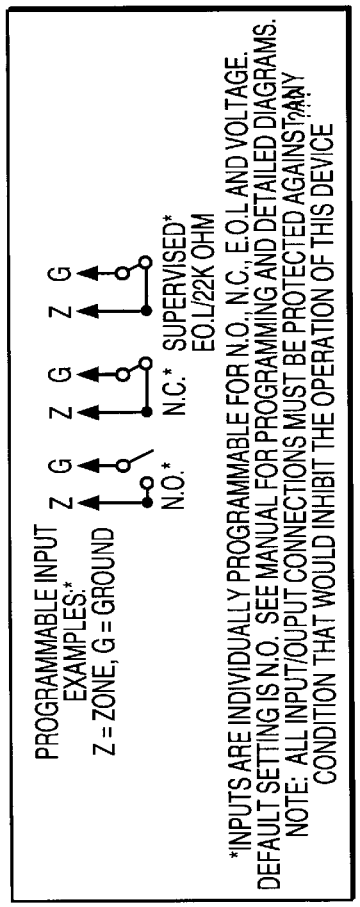
Figure 7B:
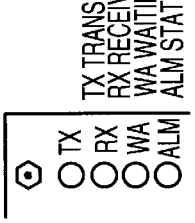
Figure 8A:
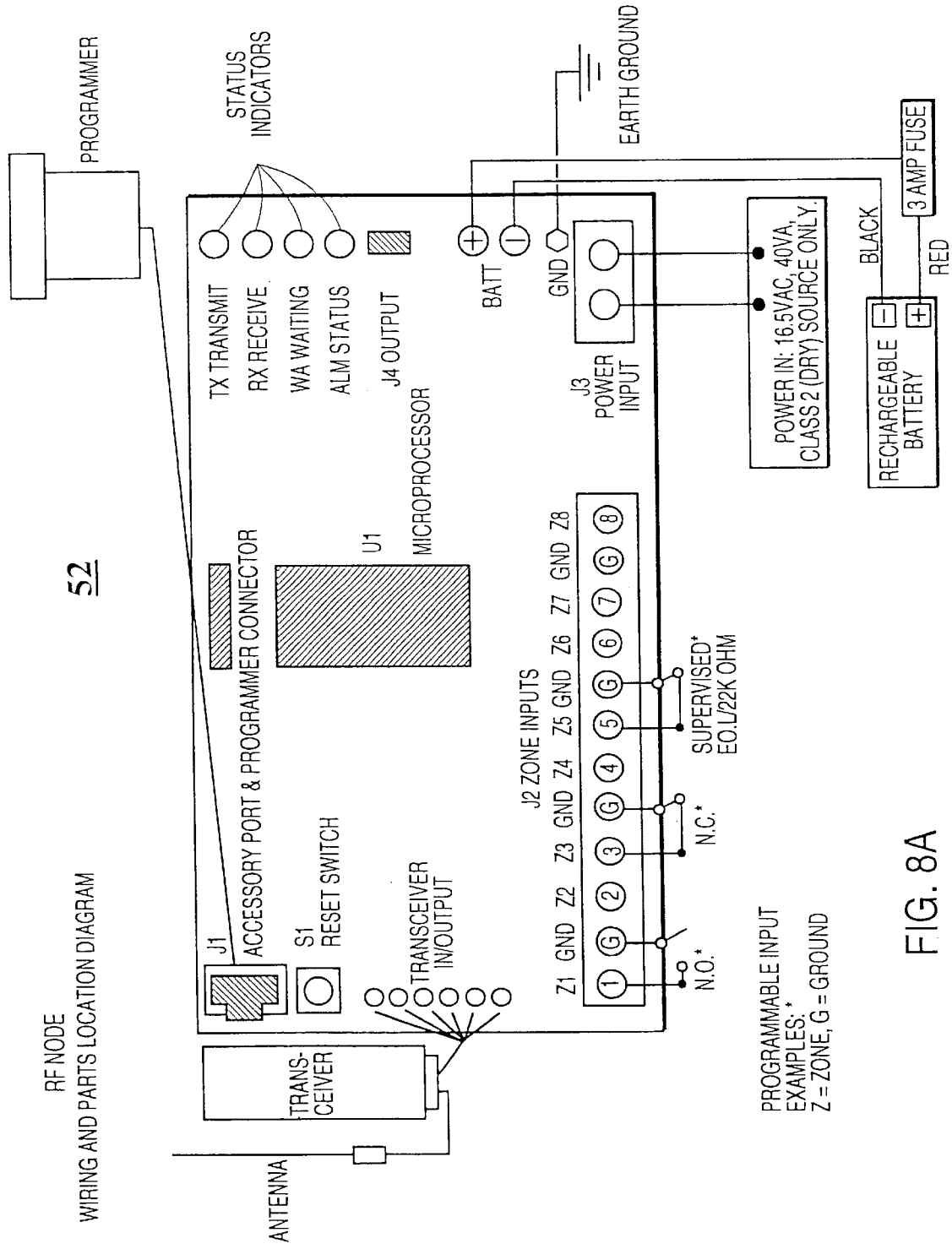
FIG. 8 is a block layout diagram and connection points of an RF node module and repeater of an illustrative embodiment.

FIGS. 7 and 8 are block diagram layouts of an RF node 52 according to the illustrative embodiment. The RF Node 52 is a hard-wired, with redundant power backup (including for example a solar based attachment module) subscriber unit that provides redundant wireless communications between facility RF modules 36 located at the end user's facility 26 and the centralized data center 22 location where the supervisory central data collector and network controller system is located. Each RF node 52 receives energy use data and transmits energy use data by radio to the central station, receiver 54. If an RF node 52 is too far away to reach the centralized data center 22 by direct radio transmission, its packetized data is relayed by another RF node 52 located closer to the centralized data center 22. Each RF node 52 sends and receives packet data to the next RF node 52. Each RF node 52 upon sending a packet wants to receive an acknowledgment of receipt by the next RF node 52 or centralized data node 52. If an acknowledgment is not received, the unit re-sends the packet. This unique, built-in "repeater" capability creates a highly reliable and continuous transmission of real-time data. The RF Node(s) 52 continually adjusts to forward packet data through the shortest and best available route. The "smart routing" capability is completely automated as the intelligence is built into the base programming of the RF Node's 52 microprocessor. Smart Routing" is controlled by each microprocessor in the network. The microprocessors are programmed to only recognize packets of information that have a complete beginning and end to the string of information. It will only acknowledge and send that packet when it recognizes that complete packet. If it does not receive the entire packet it will send a request to the transmitting RF Node 52 to send again.

The RF Node 52 is a "smart" module that is both a transceiver and a repeater, the unit has a built in power supply that is hardwired to a power source and has an independent power source for backup (preferably solar cell with a deep cell battery) and standby purposes. The module has 8 wide range zone units and auxiliary inputs for future expansion. Each of the 8 inputs is individually programmable. The Modules power requirements are 12VDC, 175 ma standby, 800 ma transmission. The backup battery is specified as a 12 V, 4 TO 7AH lead acid gel type. The radio frequency ranges is typically 450–470 MHz with radio output power of 2 watts. It uses 175 ma of current in standby mode and 800 ma for transmitting. Low battery reporting is based on a 22.5 minute test cycle (approx.). AC failure reporting is handled by reporting to the centralized data center 22 after approximately 4 minutes without AC power; and reporting AC power restoral after approximately 4 minutes of restored power. The antenna output is 12V DC signal output at output j4, 200 ohms max load.

Figure 9A:
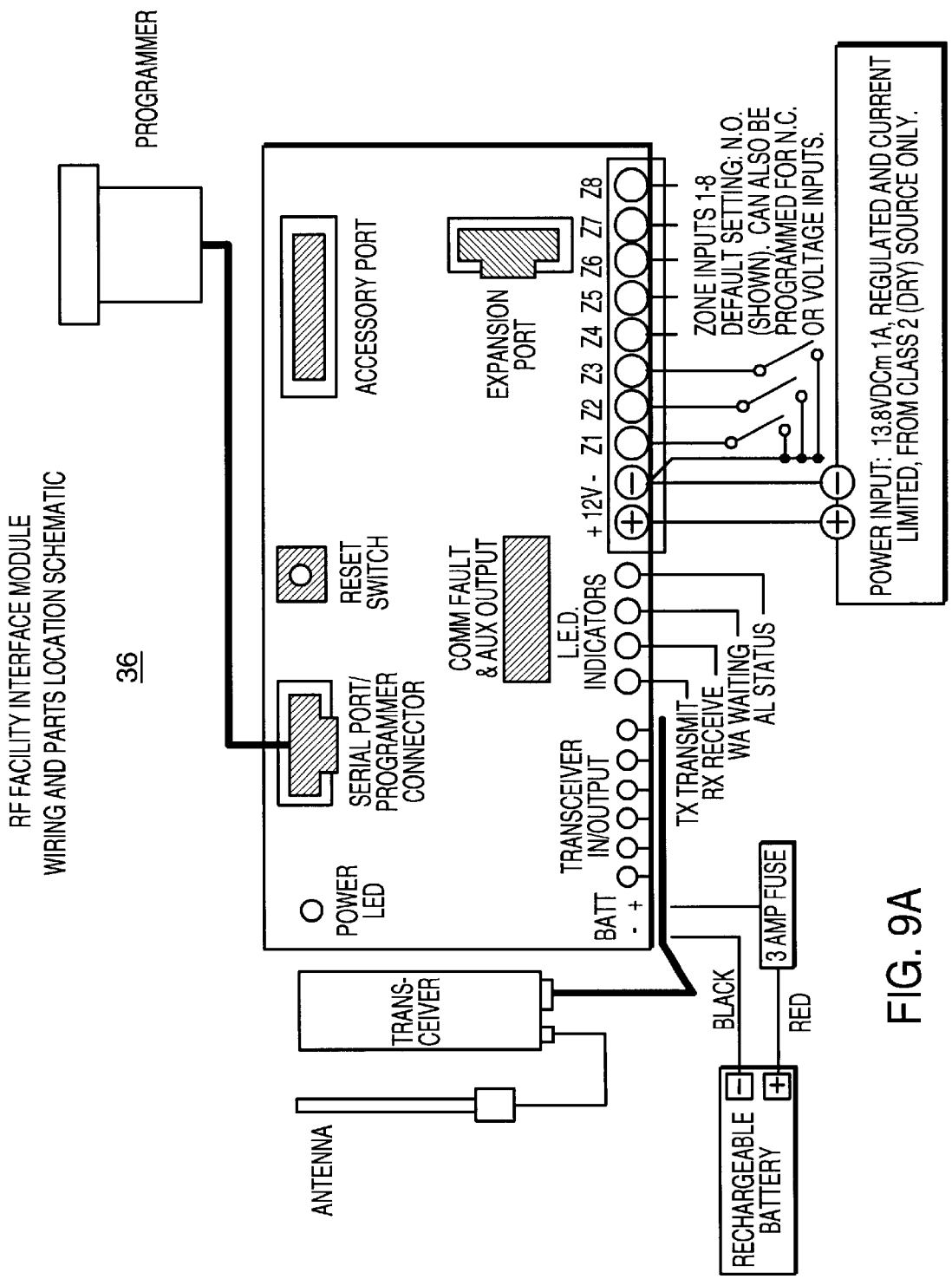
FIG. 9 is a block diagram of a facility RF module of an illustrative embodiment.

FIG. 9 is a block diagram of a facility RF module 36 in accordance with the illustrative embodiment. The facility RF module 36 collects, receives, and transmits energy data from load measurement equipment 48, 80 (current transducers, or other as required). The "smart" transceivers are specified with eight or sixteen zone inputs for multiple collection points, each is individually programmable. Each input zone reports the zone number, Unit ID and associated energy data, which is transmitted to the RF Node(s) 52 or centralized data center 22. The energy data collection time intervals are adjustable using the centralized data center 22 software or can be adjusted using a hand-held field programmer.

Figure 10:
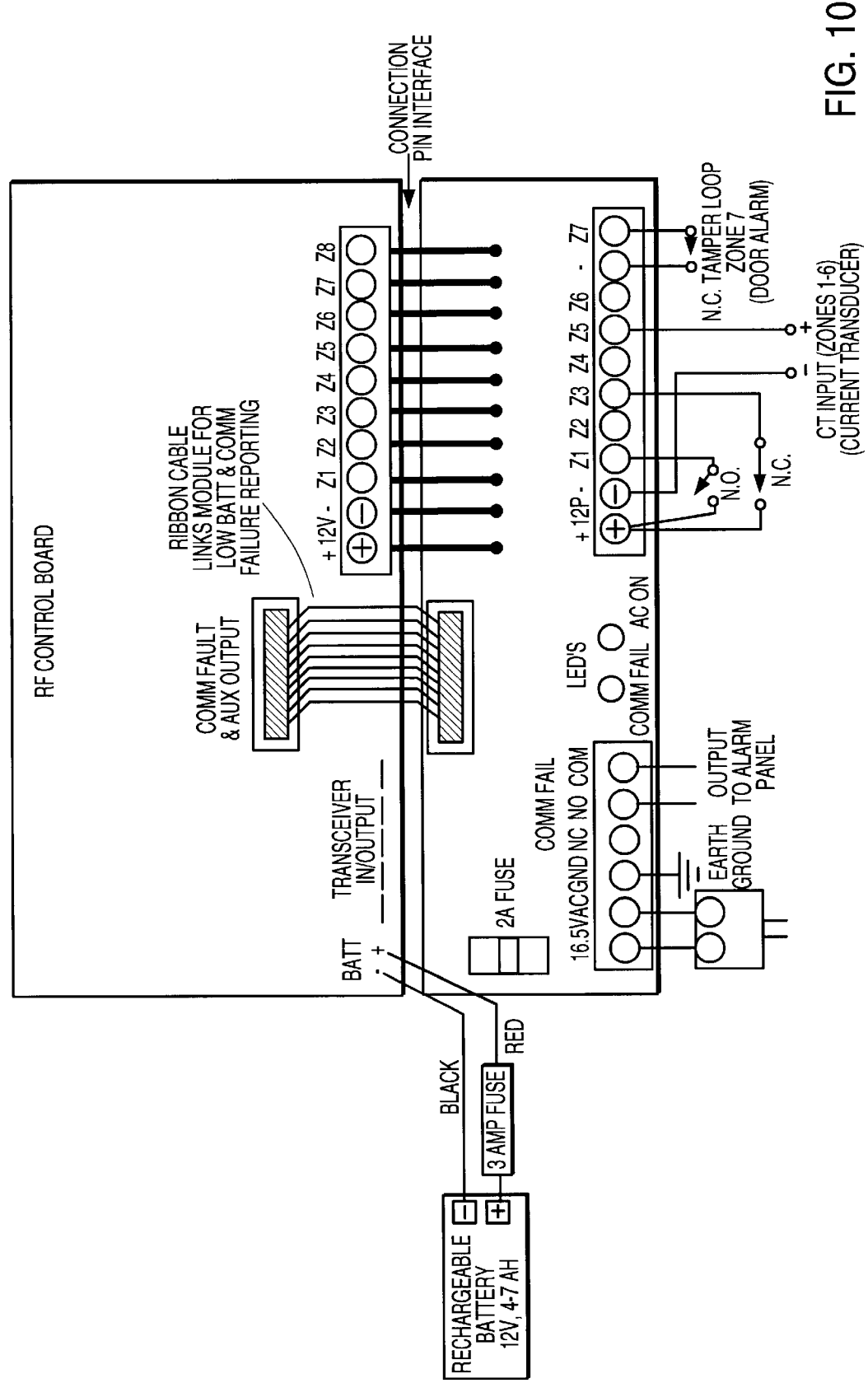
FIG. 10 is a block diagram of a current transducer interface to a facility RF module for an illustrative embodiment.
Figures 11A, 11B:
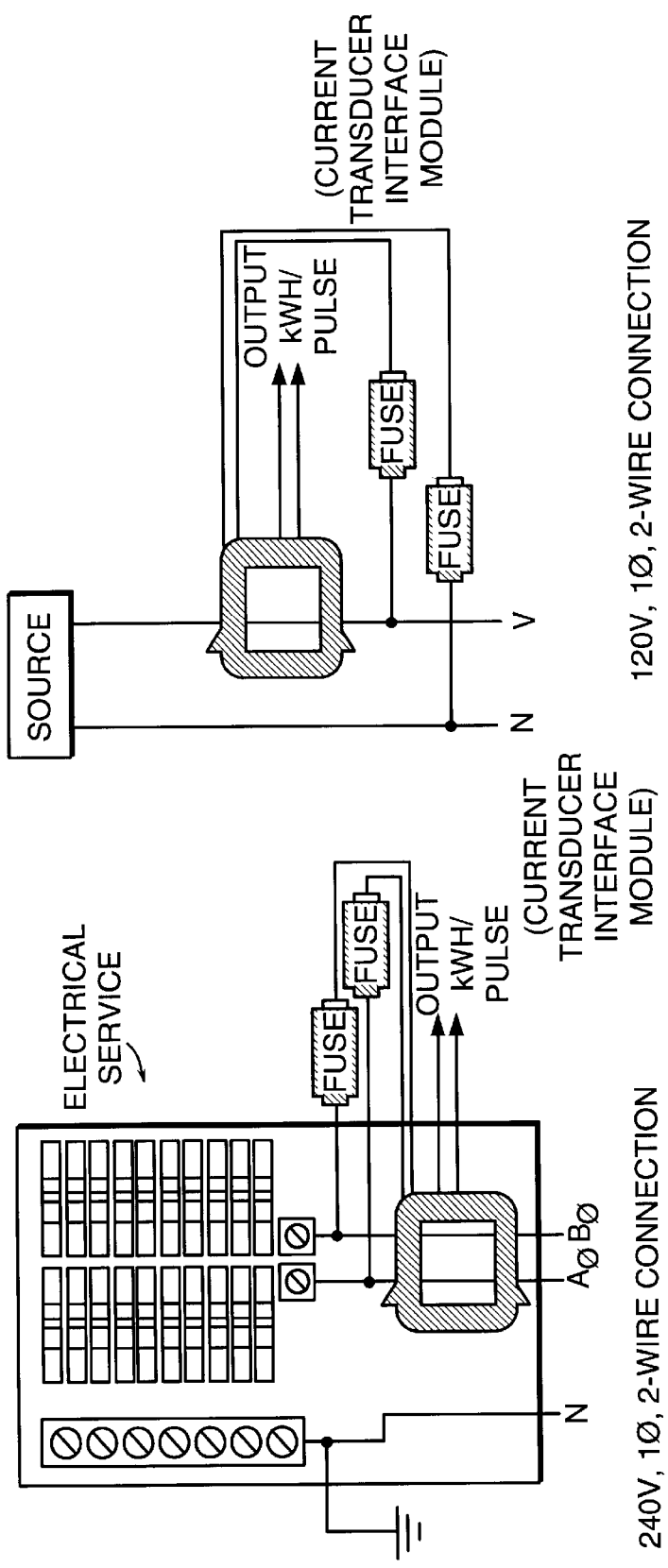
FIG. 11 shows details about measuring current for varying electric phases for an illustrative embodiment.
Figure 11C:
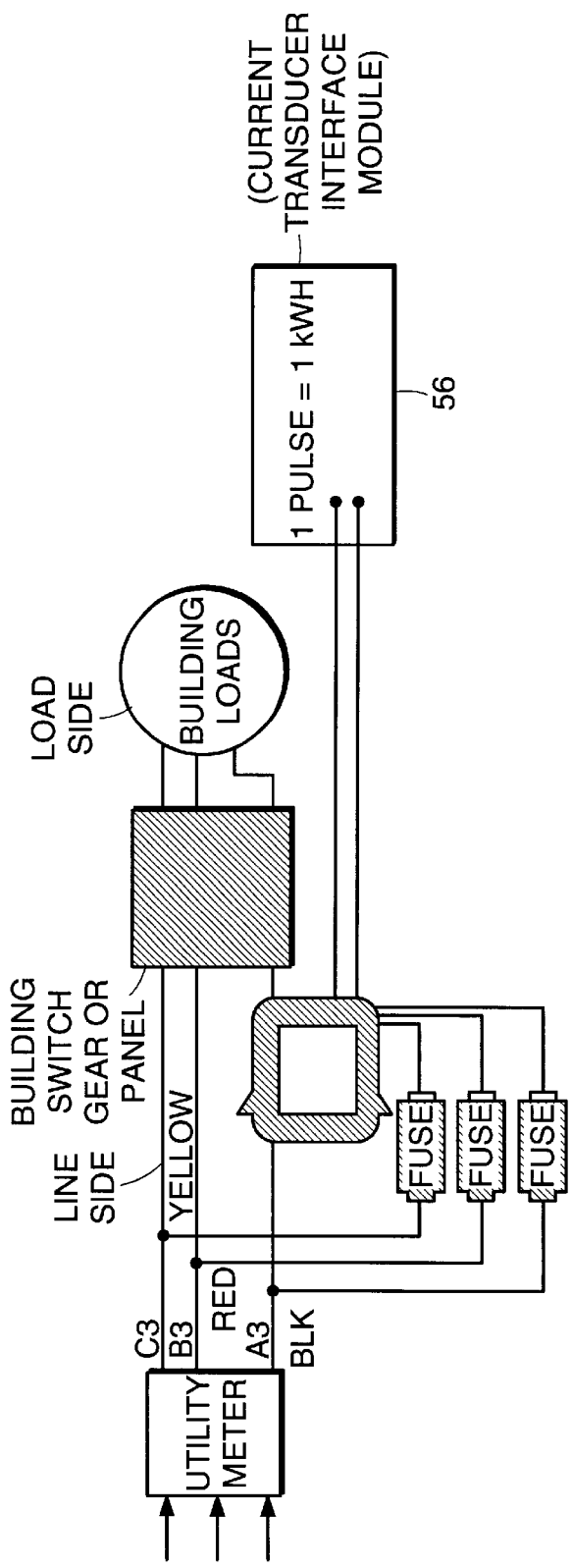

FIG. 10 is a diagram of a current transducer interface 50 to a facility RF module 36 in accordance with the illustrative embodiment. FIG. 11 provides details about measuring current for varying electric phases within end user facilities 26. These include single-phase 120 volt FIG. 11A, 240 volt FIG. 11B two wire connections and multi-phase 240/480 volt 3 and 4-wire connections, FIG. 11C. The current transducer interface 50 acts as the conversion device for energy data collected via current transducers 49 and sent through the facility RF module 36. The current transducer 49 measurement is converted to pulse output by the current transducer interface 50. The transducer measures true power consumption (kilowatt-hours). The transducer's electronics are mounted inside the same housing as an instrument grade CT to provide true power readings on 3-phase loads. The transducers preferably maintain an accuracy range of +/−1% from 10% to 100% of input range. The voltage-input range shall be field selectable from 208–480 VAC. The Transducer's power range are capable of monitoring loads of up to 1,150 kW. An example transducer 49 is the Model WL40R transducer from Ohio Semitronics Inc.

Figure 12A:
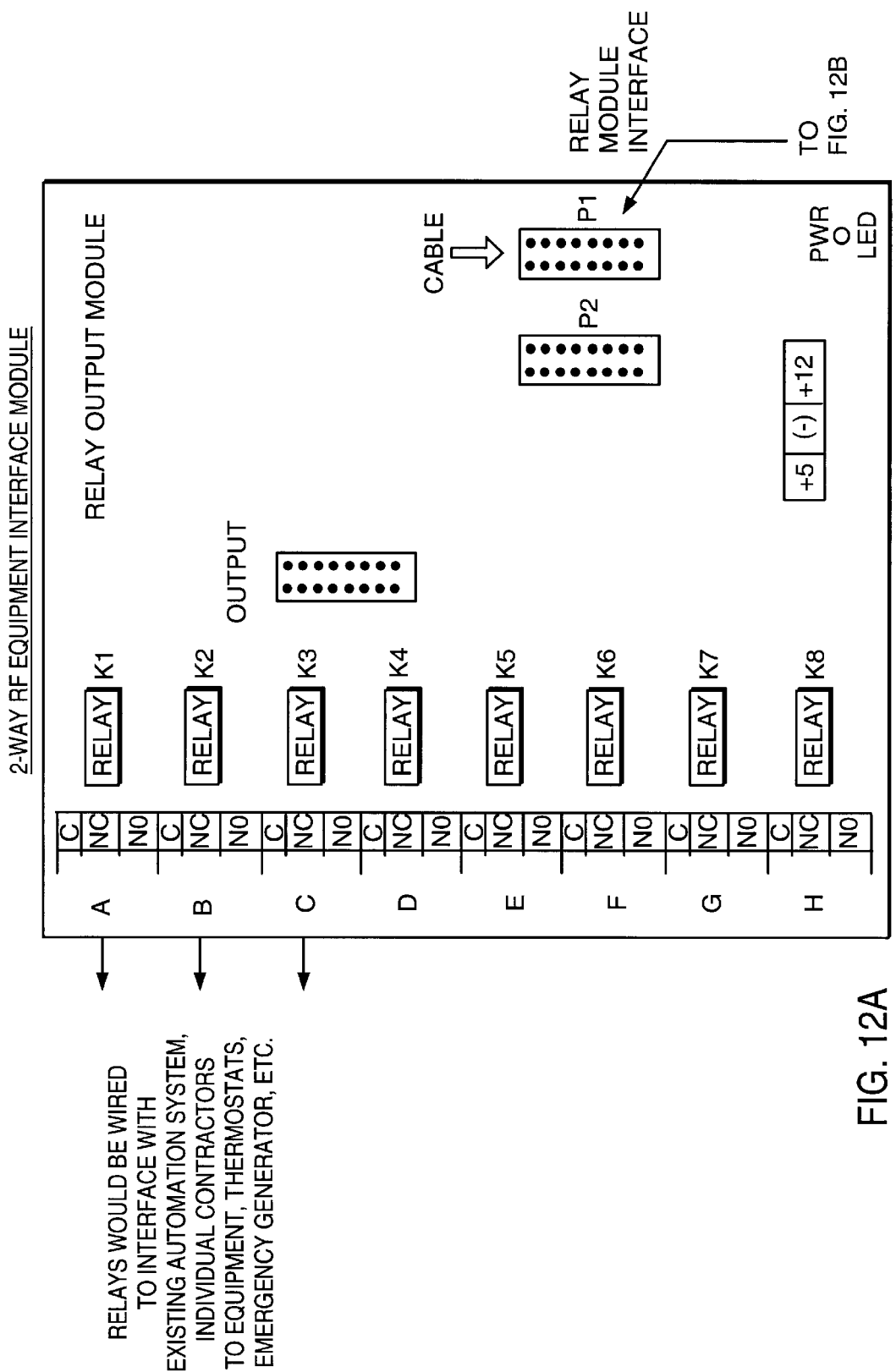
FIG. 12 is a block diagram of a two-way RF equipment interface module (EI modules) for an illustrative embodiment.
Figure 12B:
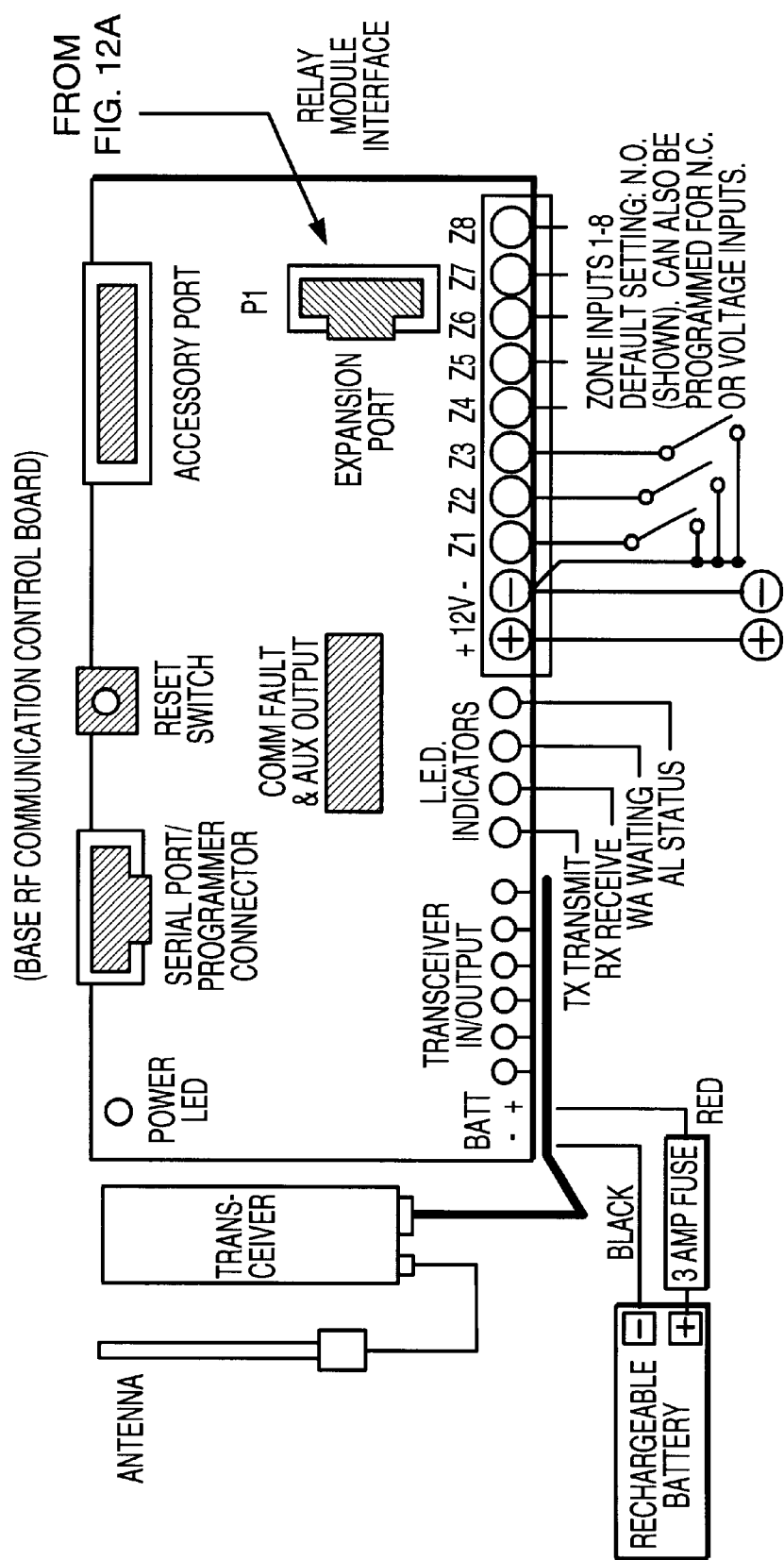

FIG. 12 is a block diagram of the two-way RF Equipment Interface Module (EI modules) 30. The relays control the power, and are wired to interface with existing automation system, or directly to power consumption device 28.

Figure 13:
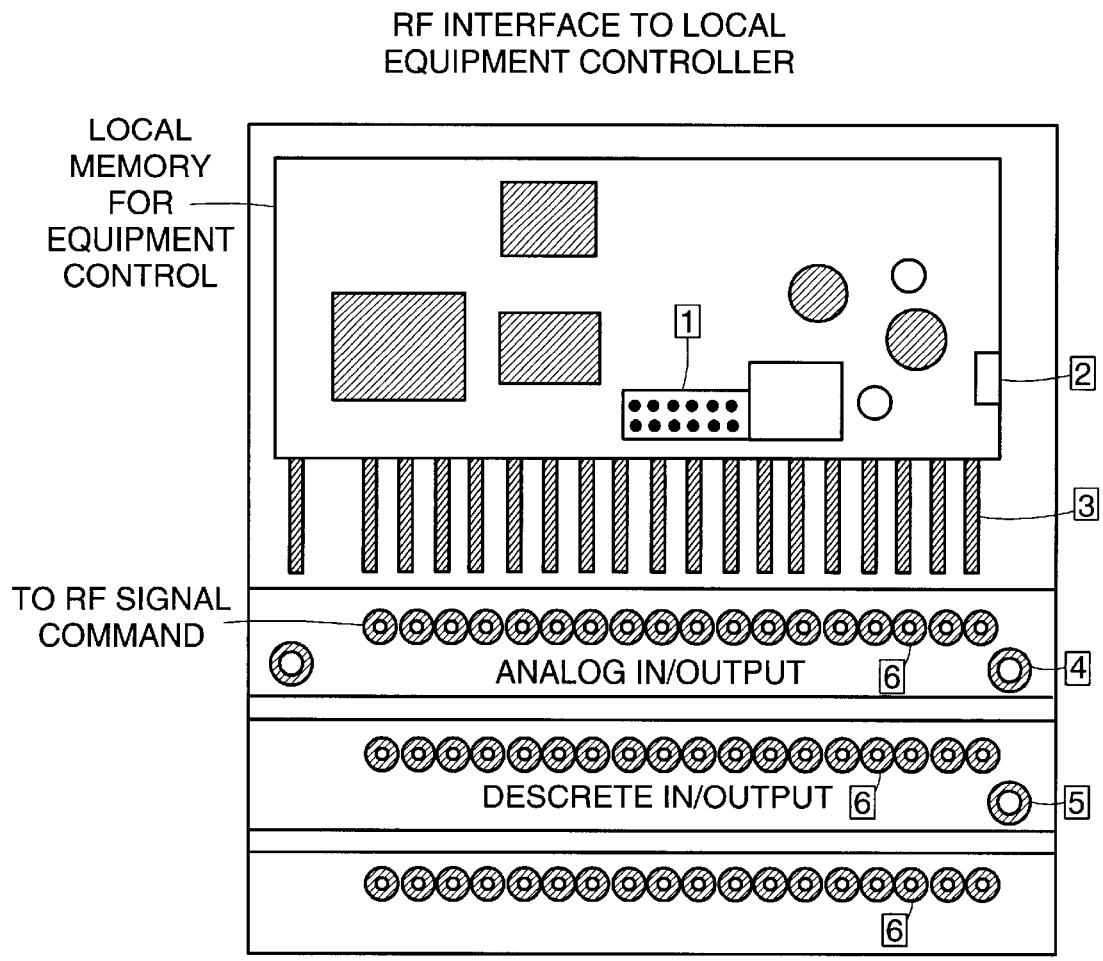
FIG. 13 is a block diagram of a two-way RF interface to a local equipment controller for an illustrative embodiment.

FIG. 13 is a block diagram of the two-way RF Interface 30 to a local equipment controller, wherein control signals (not power) are provided to the local equipment controller to allow it to control the device 28.

The present invention provides a system to allow central monitoring and control of a large number of energy consumption devices on a real time basis. The system allows up to the second information on usage and loads, and control on a similar timescale. Through central monitoring and control, energy savings based on the "macro" picture are possible. For example, simply by limiting the activation of air conditioning units at several facilities for a few minutes can help keep a utility load below a preferred limit. As other air conditioning units are cycled off, the new units can be activated. The impact on the end user is minimal and transparent. Treating homes and groups as a portfolio allows standards and predictions to be set for the power requirements of the portfolio, and allow buying and negotiating for power on a beneficial level.

The wireless network 40 described with the illustrative embodiment of the present invention has other advantages besides those already discussed. The bandwidth available provides many other uses and services. Such services include outage notification, made available to local distribution utility company. The LDC has access to a secure website that allows the LDC to identify all municipal, commercial, and industrial customers without power on a real-time basis. The LDC can also be alarmed through paging services to field personnel for proactive management of power outages. Other services include real-time energy use monitoring & management, via the collection of energy use and cost information on a real-time basis. This information is accessible via a secured website and presented in formats that allow for the proactive management of energy use. This information is accessible to appropriate parties including the customer and LDC engineering staff.

The present invention also provides for sub-metering and billing services for building tenants that occupy space within a building that is master metered. Other forms of sub-metering can be performed, such as by office or by equipment type, such as sub-metering major computer center loads within a master metered building.

The wireless network of the illustrative embodiment can monitor other environmental conditions with appropriate sensors. For example, real-time monitoring of carbon monoxide, water detection, gas leaks and furnace operation is possible. These services can be provide for both oil-fired boilers and natural gas fired furnaces that generate emissions and carbon monoxide. The present invention can monitor and control several utilities besides electricity, including piped gas, water supply, or burner usage for example to reduce smog and emissions at various times of the day or week. The system can further track CO content as well as boiler/furnace run-time to determine potential exposure. Another service is for home security service providers that currently rely on a hard-wired modem-based systems. Also, elderly monitoring services on a real-time basis can be provided. The network architecture also allows the system to track moving objects including vehicles.

Although the invention has been shown and described with respect to illustrative embodiments thereof, various other changes, omissions and additions in the form and detail thereof may be made therein without departing from the spirit and scope of the invention.

What is claimed is:

1. A method for monitoring and controlling power usage among a plurality of facilities, comprising:

providing a remotely controllable power control device on at least one power consuming device at each facility, wherein said remotely controllable power control device is interconnected between said power consuming device and a standard power distribution metering device at each facility;

remotely monitoring power usage at each facility from one location, wherein said one location can control said remotely controllable power control devices; and activating and deactivating said power consuming devices by said remotely controllable power control devices from said one location, based on said remotely monitored power usage among said plurality of facilities.

2. The method of claim 1 wherein said steps of remotely monitoring power usage and activating and deactivating are performed over a wireless communication network.

3. The method of claim 2 wherein said wireless communication network comprises a plurality of two way RF node components.

4. The method of claim 3 wherein said two way RF node components serve to both communicate with other ones of said two way RF node components; and to communicate within said facilities with said remotely controllable power control devices, and to monitor power usage within said facilities.

5. The method of claim 1 wherein said step of monitoring power usage is performed by current sensing.

6. The method of claim 5 wherein an electric utility meter at one of said facilities is not affected by said monitoring of power usage at said facility.

7. The method of claim 1 wherein said step of monitoring power usage is performed by voltage sensing.

8. The method of claim 7 wherein an electric utility meter at one of said facilities is not affected by said monitoring of power usage at said facility.

9. The method according to claim 1 wherein said step of remotely monitoring power usage at each facility includes providing a power measuring device deployed in electrical proximity to individual electrical loads and between said individual electrical loads and standard power distribution metering devices, wherein said power measuring device is in communication with said one location.

10. A system for monitoring and controlling power usage among a plurality of facilities, comprising:

a device controller coupled between at least one power consuming device and a standard power distribution metering device at each facility, said device controller to control said at least one power consuming device;

a power measurement device within each facility, to measure power consumption by power consuming devices within said facility;

a communications network, in communication with said device controllers and said power measurement devices;

a central location, in communication with said communications network, to remotely monitor power usage at each facility as measured by said power measurement device;

wherein said central location communicates with said device controllers over said communications network in order to individually control said at least one power consuming device at each facility.

11. The system of claim 10 wherein said device controller controls said at least one power consuming device by activating and deactivating said power consuming device.

12. The system of claim 10 wherein said system monitors and controls power usage in order to limit power consumption by said plurality of facilities.

13. A system for controlling energy distribution to energy consumers comprising:

a centralized data center;

a plurality of device controllers in communication with said centralized data center, wherein said device controllers are deployed in electrical proximity to individual electrical loads and between said individual electrical loads and standard power distribution metering devices;

a plurality of parameter measuring devices in communication with said centralized data center;

wherein said centralized data center reads parameters from said parameter measuring devices, computes control signals according to efficient power control algorithms operating on said parameters and communicates said control signals to said device controllers.

14. The system according to claim 13 wherein efficient power control algorithms compute said control signals to minimize power consumption by computing cost optimized power distribution over time.

15. The system according to claim 13 wherein said parameters are communicated in real time and wherein said control signals are constantly re-computed according to changes in said parameters.

16. The system according to claim 13 wherein said parameters include electrical power levels.

17. The system according to claim 13 wherein said measuring devices are deployed in electrical proximity to individual electrical loads and between said individual electrical loads and standard power distribution metering devices.

18. The system according to claim 13 further comprising facility controllers in communication between said device controllers and said centralized data center.

19. The system according to claim 18 wherein said centralized data center and said facility controller are in wireless communication.

20. The system according to claim 13 wherein said centralized data center and said device controllers are in wireless communication.

* * * * *